(12) United States Patent
Nägel et al.

(10) Patent No.: US 12,385,416 B2
(45) Date of Patent: Aug. 12, 2025

(54) BRAZING PLUG, COMPONENT OF A GAS TURBINE AND METHOD

(71) Applicant: Siemens Energy Global GmbH & Co. KG, Bayern (DE)

(72) Inventors: Thomas Nägel, Berlin Spandau (DE); Ingo Reinkensmeier, Fröndenberg (DE); Harald Krappitz, Köngen (DE); Jane Awayes, Berlin (DE); Michael Stemmler, Düsseldorf (DE); Sheik Minhaz Uddin, Esslingen (DE)

(73) Assignee: Siemens Energy Global GmbH & Co., KG, Bayern (DE)

( * ) Notice: Subject to any disclaimer, the term of this patent is extended or adjusted under 35 U.S.C. 154(b) by 0 days.

(21) Appl. No.: 18/700,800

(22) PCT Filed: Sep. 9, 2022

(86) PCT No.: PCT/EP2022/075069
§ 371 (c)(1),
(2) Date: Apr. 12, 2024

(87) PCT Pub. No.: WO2023/066565
PCT Pub. Date: Apr. 27, 2023

(65) Prior Publication Data
US 2024/0410295 A1    Dec. 12, 2024

(30) Foreign Application Priority Data
Oct. 20, 2021    (DE) .................... 10 2021 211 825.9

(51) Int. Cl.
*F01D 25/00* (2006.01)
*B23K 1/00* (2006.01)
*B23K 35/30* (2006.01)

(52) U.S. Cl.
CPC ............ *F01D 25/00* (2013.01); *B23K 1/0018* (2013.01); *B23K 35/3033* (2013.01); *B23K 35/3046* (2013.01); *F05D 2230/237* (2013.01)

(58) Field of Classification Search
CPC . F01D 25/00; F05D 2230/237; B23K 1/0018; B23K 35/3033; B23K 35/3046
See application file for complete search history.

(56) References Cited

U.S. PATENT DOCUMENTS

2004/0060964 A1    4/2004    Kottilingam
2010/0059573 A1*   3/2010    Kottilingam ....... B23K 35/3046
                                                              228/164

(Continued)

OTHER PUBLICATIONS

PCT International Search Report and Written Opinion of International Searching Authority mailed Jan. 23, 2023 corresponding to PCT International Application No. PCT/EP2022/075069 filed Sep. 9, 2022.

*Primary Examiner* — Elton K Wong
(74) *Attorney, Agent, or Firm* — Wolter Van Dyke Davis, PLLC

(57) ABSTRACT

A plug for brazing in a through-hole and for sealing a through-hole in a substrate of a gas turbine component. The plug has at least one elongate part and a head, wherein the head is made wider in cross section than the elongate part. The elongate part has a cross section which becomes smaller towards its end face along its longitudinal axis, wherein the elongate part has a peripheral region on its end face, wherein the peripheral region of the elongate part has a brazing filler metal. The head has a peripheral region on its end face, wherein the peripheral region of the head has a brazing filler metal, and the remaining and largest part of the elongate part and of the head has a mixture of brazing filler metal and a substrate material.

20 Claims, 3 Drawing Sheets

(56) References Cited

U.S. PATENT DOCUMENTS

| | | | |
|---|---|---|---|
| 2011/0076151 A1* | 3/2011 | Cui | B23K 1/0056 |
| | | | 219/121.81 |
| 2013/0101828 A1* | 4/2013 | Park | B23K 35/0244 |
| | | | 228/208 |
| 2015/0047168 A1 | 2/2015 | James | |
| 2020/0384560 A1* | 12/2020 | Rebbecchi, Jr. | B23K 1/20 |

\* cited by examiner

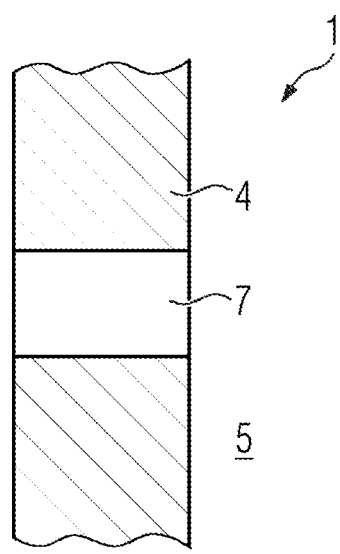
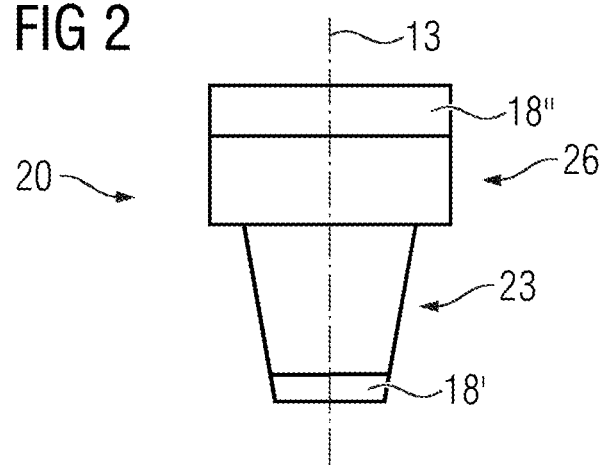

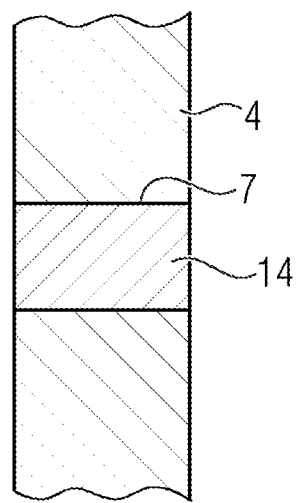

BRAZING PLUG, COMPONENT OF A GAS TURBINE AND METHOD

CROSS REFERENCE TO RELATED APPLICATIONS

This application is the US National Stage of International Application No. PCT/EP2022/075069 filed 9 Sep. 2022, and claims the benefit thereof, which is incorporated by reference herein in its entirety. The International Application claims the benefit of German Application No. DE 10 2021 211 825.9 filed 20 Oct. 2021.

FIELD OF INVENTION

The invention relates to a plug for components of gas turbines, which is brazed in, to a component of a gas turbine, and to a method.

BACKGROUND OF INVENTION

Turbine components in the hot-gas region of gas turbines are usually produced in a vacuum investment casting process.

In this process, mold cores are frequently placed in order to generate cavities for cooling concepts.

These mold cores are normally held in position by means of platinum pins. As a result of the process, these platinum pins can melt away prematurely and lead to sliding of the mold cores and thus to dimensional deviations.

Ceramic holding pins, in contrast, are more process-stable, but they leave behind punctures (through-holes) when used.

This through-hole must be sealed for the finished cast component of a gas turbine.

Such mold cores are used for turbine blades for gas turbines in a power class of greater than 200 MW.

The same problem also arises when other through-holes are produced in components of gas turbines as a result of any necessary remediation of cracks or other defects.

This can be accomplished by simply filling the through-hole by brazing with brazing filler metal, but that is not always satisfactory.

SUMMARY OF INVENTION

Therefore, the invention is based on an object of solving the aforementioned problem.

This object is achieved by a plug, by a component, and by a method as claimed.

The dependent claims list additional advantageous measures, which can be combined with one another in any way in order to achieve additional advantages.

BRIEF DESCRIPTION OF THE DRAWINGS

In the drawings:
FIG. 1 shows a component having a through-hole,
FIGS. 2 and 3 show plugs according to the invention,
FIG. 5 shows a plug in the wall after brazing.
The figures and the description present merely an exemplary embodiment of the invention.

DETAILED DESCRIPTION OF INVENTION

Figure 3:
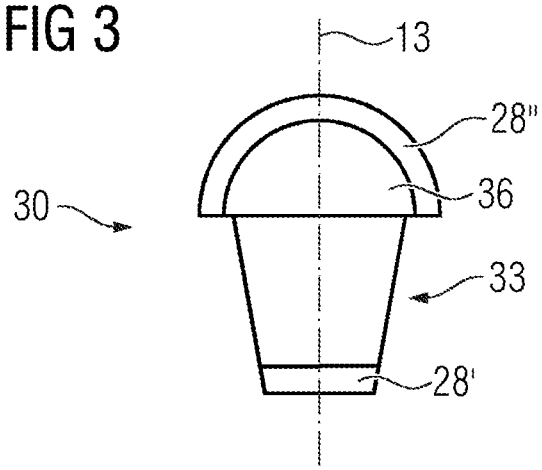

By means of this plug concept, both the reject rate and innovative cooling concepts can be implemented.

Any boundary conditions for use in the hot-gas region of gas turbines are taken into account here:
temperature resistance and oxidation resistance,
material properties,
mechanical integrity.

Brazing with a flexible material with infiltration technology is a completely new production possibility for the plug.

FIG. 1 shows a cast component 1 for a gas turbine with a through-hole 7.

The component 1 has a wall 4 adjoining a cavity 5, which is not presented in greater detail.

During the casting, there was a core in the region of the cavity 5, and this core was supported relative to an outer casting mold by a pin in the region of the through-hole 7.

This through-hole 7 in the wall 4 of the component 1 should be sealed. This applies in general to all components 1 having through-holes 7.

The through-hole 7 preferably has a cylindrical or symmetrical shape.

But this is not a restriction, because the shape of the plug can be modified in any way.

The wall 4 has a substrate material, in particular a nickel-based or cobalt-based superalloy.

FIG. 2 shows a first plug 20 according to the invention in a plan view or cross section.

The plug 20 comprises an elongate part 23 and a head 26.

In particular, the plug 20 consists of the elongate part 23 and the head 26 and is preferably formed as a single piece.

The plug 20 has a longitudinal axis 13.

The head 26 adjoins the elongate part 23, in particular concentrically, or sits thereon.

The elongate part 23 of the plug 20 has, perpendicularly to the longitudinal axis 13 of said elongate part, a cross section which becomes smaller toward the end face (18'); in particular, the elongate part 23 is frustoconical in the drawing plane.

Figure 4:
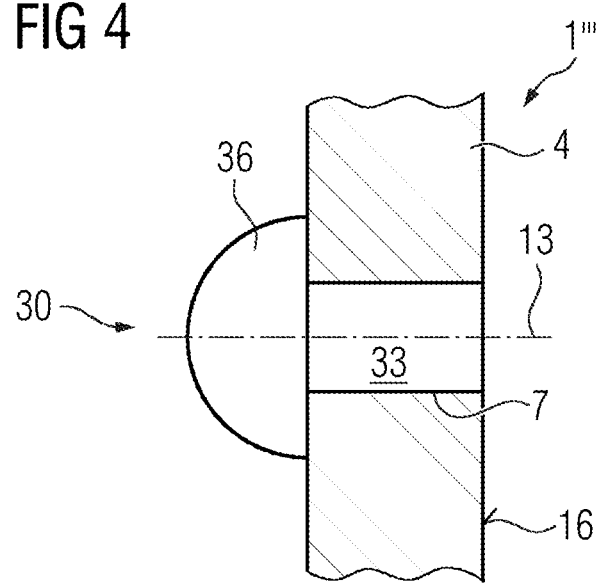
FIG. 4 shows the approach used during brazing.

The elongate part 23 will be located completely in the through-hole 7 during brazing (FIG. 4).

During brazing, the head 26 will remain outside the through-hole 7 and in particular be seated against the outside of the wall 4 (FIG. 4).

The plug 20 has a brazing filler metal layer in its peripheral region 18' of the elongate part 23 and a brazing filler metal layer in the peripheral region 18" of the head 26, i.e. the brazing filler metal layers form the respective peripheral regions 18', 18".

The outer peripheral regions 18', 18" have a composition of 100% brazing filler metal material or at least a higher proportion of brazing filler metal material, in particular of absolutely at least 60%, in particular of at least 70% brazing filler metal material, i.e. the remainder may form a substrate material of the plug 20.

The remaining region of the elongate part 23 and of the head 26 has a mixture of this substrate material and preferably the same brazing filler metal material.

Outside of the peripheral regions 18', 18"; 28', 28" (FIG. 3), the plug 20 therefore has a mixture ratio of brazing filler metal material and substrate material of 40 wt. %:60 wt. % to 0 wt. %:100 wt. %, in particular 10 wt. %:90 wt. %.

The proportion of the brazing filler metal material in this "inner" region differs from the peripheral regions 18', 18"; 28', 28" (FIG. 3) at least relatively by 20%.

The substrate material of the plug 20, 30 (FIG. 3) is preferably the same as the substrate material of the wall 4 or is similar.

The brazing filler metal material is preferably also a nickel-based or cobalt-based alloy, said alloy having a melting temperature which is at least 10 K, in particular at least 20 K, lower than that of the substrate material (of the wall 4 or of the plug 20, 30).

This is achieved preferably by addition of boron (B) and/or silicon (Si) and/or phosphorus (P).

The thickness of the peripheral regions 18', 18"; 28', 28" is selected such that, after the brazing, which brings about a homogenization, there is a distribution of substrate material to brazing filler metal material for the entire plug 20, 30 (FIG. 5).

The brazing filler metal material in the peripheral regions 18', 18"; 28', 28" and the brazing filler metal material for the mixture of substrate material and brazing filler metal material between the peripheral regions 18', 18" is preferably the same.

The geometry of the elongate part 23 is almost complementary to the geometry of the through-hole 7.

FIG. 3 shows another variant of a plug 30 according to the invention in cross section, the head 36 of which plug is a spherical head in contrast to FIG. 2, but likewise has an elongate part 33 again.

In the outer peripheral regions 28', 28" of the plug 30, there are again regions which, in particular, consist only of brazing filler metal material.

Otherwise, the statements according to FIG. 2 apply, except for the geometry of the head 36, i.e. the peripheral region 28" is not a plate but rather a hollow hemisphere.

FIG. 4 shows, in simplified form, the arrangement of the plugs 20, 30 in the component 1 having the through-hole 7, shown here for the plug 30 by way of example, in the case of which plug the elongate part 33 with the peripheral region 28' is located completely in the through-hole 7 and fills said through-hole and the head 36 is seated against the outside of the wall 4.

The plug 30, 20 was preferably pressed into the through-hole 7 while in the green state, i.e. as a powder compact with binder.

Before the plug 20, 30 is brazed within the through-hole 7, a debinding process occurs.

After the brazing, brazing filler metal material of the peripheral regions 18', 18"; 28', 28" and brazing filler metal material of the elongate part 23, 33 have become evenly distributed, i.e. with 50% substrate material: 50% brazing filler metal material to 75% substrate material: 25% brazing filler metal material, in particular 60% substrate material: 40% brazing filler metal material to 75% substrate material: 25% brazing filler metal material, for a brazing filling 14.

After the excess material due to the head 26, 36 has been remediated, an arrangement according to FIG. 5 is obtained, in which there is an even distribution of substrate material and brazing filler metal material in the brazing filling 14 in the through-hole 7.

Of course, in the peripheral regions between the region 14 and the wall 4 there are manifestations of the diffusion of brazing filler metal material into the substrate material of the wall 4.

The invention claimed is:

1. A plug (20, 30) for brazing into a through-hole (7) and for sealing the through-hole (7) in a wall (4) of a gas turbine component, the plug (20, 30) comprising:
    at least an elongate part, (23, 33) and
    a head (26, 36), which adjoins the elongate part (23, 33),
    wherein the head (26, 36) is wider in cross section than the elongate part (23, 33),
    wherein the elongate part (23, 33) comprises a cross section,
    wherein the elongate part (23, 33) comprises, at an end surface thereof, a peripheral region (18', 28'),
    wherein the peripheral region (18', 28') of the elongate part (23, 33) comprises a brazing filler metal material,
    wherein the head (26, 36) comprises, at an end surface thereof, a peripheral region (18", 28"),
    wherein the peripheral region (18", 28") of the head (26, 36) comprises the brazing filler metal material,
    wherein the remaining and largest part of the elongate part (23, 33) and of the head (26, 36) comprises a mixture of the brazing filler metal material and a substrate material,
    wherein a respective proportion of the brazing filler metal material in each of the peripheral regions is greater than a proportion of the brazing filler metal material in the remaining and largest part of the elongate part and of the head, and
    wherein the peripheral regions and the remaining and largest part of the elongate part and of the head are formed by a single body.

2. The plug as claimed in claim 1,
    wherein a mixture ratio of brazing filler metal material and the substrate material of the plug (20, 30) outside the peripheral regions (18', 18"; 28', 28") is 40 wt. %: 60 wt. % to 0 wt. %: 100 wt. %.

3. The plug as claimed in claim 1,
    wherein the substrate material of the plug (20, 30) is a nickel- or cobalt-based superalloy.

4. The plug as claimed in claim 1,
    wherein the head (36) is hemispherical or half-oval-shaped.

5. The plug as claimed in claim 1,
    wherein the head (26) is cylindrical.

6. The plug as claimed in claim 1,
    wherein the brazing filler metal material for the peripheral regions (18', 18"; 28', 28") is a nickel-based or cobalt-based alloy which comprises a melting temperature which is at least 10 K lower than that of the substrate material.

7. A component (1) for a gas turbine, and/or a turbine blade, comprising:
    a wall (4) as a substrate,
    wherein the wall (4) comprises a through-hole (7),
    wherein a plug (20, 30) as claimed in claim 1 was installed, then brazed, and then machined to be flush with the wall.

8. The component as claimed in claim 7,
    wherein a substrate material of the wall (4) is a nickel- or cobalt-based superalloy.

9. The component as claimed in claim 7,
    wherein, after the brazing, a mixture ratio of brazing filler metal material to a substrate material of the plug (20, 30) with respect to the entire plug (20, 30) is 50%: 50% to 25%: 75%.

10. The component as claimed in claim 7,
    wherein a substrate material of the wall (4) corresponds to a substrate material for the mixture of the elongate part (23, 33) and/or of the head (26, 36) of the plug (20, 30) within the peripheral regions (18', 18"; 28', 28").

11. The component as claimed in claim 7,
    wherein the elongate part (22, 33) of the plug (20, 30) is arranged in an interior of the through-hole (7), and the peripheral region (18', 28') of the elongate part (23, 33) is part of an outer or inner surface of the wall (4).

12. A method for joining plugs (20, 30) in a through-hole (7) to a wall (4), comprising:

installing a plug as claimed in claim 1 in a through-hole in a wall;

carrying out a brazing heat treatment with the plug (20, 30) in a manner that is effective to distribute the substrate material into a peripheral region disposed at an end surface of the elongate part and into a peripheral region disposed at an end surface of the head.

13. The method as claimed in claim 12, further comprising:

removing excess material after the brazing heat treatment.

14. The method as claimed in claim 12, wherein the brazing heat treatment is effective to uniformly distribute the substrate material throughout the entire plug.

15. The plug as claimed in claim 1,
wherein the head adjoins the elongate part concentrically.
16. The plug as claimed in claim 1,
wherein the elongate part (23, 33) comprises a cross section which becomes smaller along a longitudinal axis (13) of said elongate part toward an end face of said elongate part.
17. The plug as claimed in claim 1,
wherein the elongate part (23, 33) is frustoconical in cross section.
18. The plug as claimed in claim 1,
wherein the peripheral region (18', 28') of the elongate part (23, 33) is composed of only brazing filler metal material.
19. The plug as claimed in claim 1,
wherein the peripheral region (18", 28") of the head (26, 36) is composed of only brazing filler metal material.
20. The plug as claimed in claim 1,
wherein the single body is a green body.

* * * * *